United States Patent [19]

Brausfeld et al.

[11] Patent Number: 4,475,572

[45] Date of Patent: Oct. 9, 1984

[54] MULTIWAY VALVE DEVICE

[75] Inventors: Walter Brausfeld, Hanover; Helmut Göttling, Isernhagen, both of Fed. Rep. of Germany

[73] Assignee: WABCO Steuerungstechnik GmbH, Hanover, Fed. Rep. of Germany

[21] Appl. No.: 319,486

[22] Filed: Nov. 9, 1981

[30] Foreign Application Priority Data

Dec. 6, 1980 [DE] Fed. Rep. of Germany ....... 3046095

[51] Int. Cl.³ ........................................... F16K 11/087
[52] U.S. Cl. ............................ 137/625.23; 137/625.47
[58] Field of Search ....................... 137/625.22, 625.47, 137/625.23, 625.21, 625.25

[56] References Cited

U.S. PATENT DOCUMENTS

| 2,715,913 | 8/1955 | Taylor | 137/625.25 |
| 2,985,191 | 5/1961 | Beckett et al. | 137/625.22 |
| 3,370,612 | 2/1968 | Holl | 137/625.47 |
| 4,031,918 | 6/1977 | Cagle | 137/625.47 |

FOREIGN PATENT DOCUMENTS 2457226 12/1975 Fed. Rep. of Germany .

Primary Examiner—Martin P. Schwadron
Assistant Examiner—James R. Shay
Attorney, Agent, or Firm—G. J. Falce

[57] ABSTRACT

A multiway valve device in which a handle-operated ball member is operatively disposed in a spherical cavity to which a plurality of passages is connected. The ball member is arranged with a single seal ring that encloses a recessed area at one end of the ball that is sized to establish fluid pressure communication between a supply passage and one or the other of a pair of delivery passages depending upon the handle being located in an extreme right- or left-hand position. A vent passage opens into the spherical cavity in the area of the ball opposite the recessed area enclosed by the seal ring to exhaust pressure from whichever delivery passage is cut off from the supply passage. The spherical cavity lies partly in the body of the valve device and partly in a cover portion, which when secured to the body, rotatably supports the ball member. An annular recess or flattened region is formed on the surface of the ball member to increase the flow capacity of the vented delivery passage and to also permit removal of the ball, when the interface between the body and cover is offset from the center of the spherical cavity. By offsetting the body/cover interface, the larger area in which to accommodate all the passages within the body portion is provided without increasing the overall size of the valve device.

11 Claims, 1 Drawing Figure

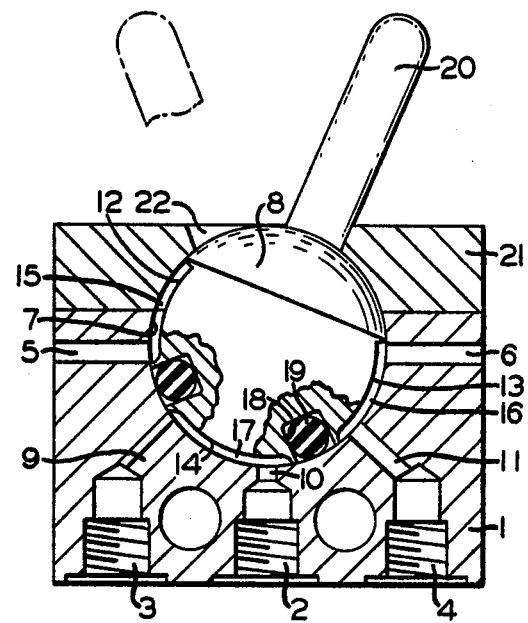

MULTIWAY VALVE DEVICE

BACKGROUND OF THE INVENTION

The present invention relates to improvements in multiway valves particularly multiway ball type valves.

Multiway ball type valves are commonly known in the prior art, being generally arranged with a housing in which a ball valve member is operably disposed. The ball valve is operated by a handle so as to rotate about a vertical axis of the ball. Porting in the valve housing is aligned in a plane of the vertical axis of the ball, so that when the ball valve member is rotated, a fluid pressure connection between the porting is either established or interrupted. A fluid pressure connection between the porting is made by means of either a bore in the ball member or by means of channels formed in the ball surface. The ball member cooperates with opposing sealing members in the valve housing that surround the porting to establish a fluid pressure seal between the ports when the ball is rotated to interrupt the fluid pressure connection. These sealing members further serve to support the ball valve within the housing. An additional seal generally in the form of an O-ring associated with the handle stem is provided to establish a fluid pressure seal between the interior of the ball valve and atmosphere.

This known multiway ball valve design suffers from the disadvantage of elaborate design measures for mounting and sealing the ball valve within the housing and for sealing and guiding the ball valve handle. In addition to these elaborate design measures making the multiway ball valve device relatively costly, the number of sealing members and particularly the size of these sealing members results in relatively high friction forces and thus high handle operating forces.

SUMMARY OF THE INVENTION

The object of the present invention, therefore, is to overcome the mentioned disadvantages of the prior art by providing a multiway ball type valve that is simple in design with a minimum of sealing elements.

This object is achieved by arranging, in a body portion of the valve device, a specific configuration of fluid pressure porting that opens into a cavity housing the ball valve such that a sealing ring on the ball member is effective with rotation of the ball valve member to control fluid pressure communication between selective ones of the valve ports.

BRIEF DESCRIPTION OF THE DRAWINGS

This object and other attendant advantages of the invention will become apparent from the following more detailed explanation with the aid of the single FIGURE drawing showing a sectional elevation view of a preferred embodiment of the invention.

DESCRIPTION AND OPERATION

The multiway valve device includes a housing 1 with five fluid pressure terminals 2, 3, 4, 5 and 6 preferably aligned in a semi-circle. Two of these terminals 5 and 6 are vented to atmosphere, terminal 2 is connected to a source of fluid pressure (not shown), and terminals 3 and 4 are connected to receivers (not shown). Housing 1 is also formed with a portion of a spherical cavity 7 in which a ball valve member 8 is operably disposed. Terminals 2, 3 and 4 are connected by passages 9, 10 and 11 to the cavity 7, while terminals 5 and 6 are connected directly to cavity 7. Ball valve member 8 is formed with recessed areas 12, 13 and 14, which cooperate with the wall of cavity 7 to form chambers 15, 16 and 17, it being understood that recessed areas 12 and 13 actually constitute a single annular groove or an annular flattened area of ball 8, while recess 14 may be either a spherical recess, as shown, or a flattened area of the ball 8. A circumferential groove 18 is formed in the surface of ball 8 and runs through two aligned corner points of the recessed areas 12, 13 and 14. A sealing ring 19 is contained in groove 18 for sealing engagement with the wall of cavity 7. Sealing ring 19 surrounds recessed area 14 of ball 8 and cooperates with the wall of cavity 7 to seal the chamber 17, into which passage 10 opens, from chambers 15 and 16. An operating handle 20 is formed integral with ball 8. A cover portion 21 is provided with a planar surface that interfaces with a corresponding planar surface of the housing 1 with which the cover is suitably secured. Cover portion 21 is formed with a complementary spherical portion which fits over ball 8 to support the ball in cavity 7. An opening 22 is provided in cover 21 via which operating handle 20 passes. The opposing sides of opening 22 provide limit stops to establish two extreme positions of the ball valve, as hereinafter explained.

In the extreme right-hand position of handle 20, as shown, recessed area 14 of ball valve member 8 locates chamber 17 such that passages 9 and 10 are placed in fluid communication, thus connecting the source of fluid pressure at terminal 2 to the receiver to which terminal 3 is connected.

The other receiver to which terminal 4 is connected is cut off from the source of fluid pressure, and from the connected receiver, since passage 11 opens into chamber 16 formed by the annular groove constituted by recessed areas 12 and 13, on the opposite side of sealing element 19 from recessed area 14. Recessed areas 12 and 13 constituting the mentioned annular groove or flattened area of ball 8 in turn establish a high capacity fluid pressure communication between terminal 4 and the vent terminals 5 and 6. Consequently, in the shown position of handle 20, the multiway ball valve device supplies a source of air to the receiver connected to terminal 3, while concurrently exhausting air in the receiver connected to terminal 4.

When operating handle 20 is moved to a neutral position intermediate the mentioned extreme left- and right-hand positions, sealing element 19 isolates both receivers 3 and 4 from the source of fluid pressure at terminal 2. In this position, both receivers are connected to atmosphere via terminals 5 and 6, and recessed areas 12 and 13 forming the mentioned annular groove in ball member 8.

In the extreme left-hand position of handle 20, chamber 17, which is surrounded by sealing element 19, places terminals 2 and 4 in fluid communication, while terminal 3 is connected to atmosphere via recessed area 12 and vent terminal 5. Thus, air is supplied to the receiver connected to terminal 4 and is exhausted from the receiver connected to terminal 3.

In order to contain all of the fluid pressure terminals within housing 1, the housing is designed to encompass a greater area of ball member 8 than does the cover 21. This results in the portion of spherical cavity 7 in housing 1 having an opening that is smaller than the diameter of ball 8. The reduced section of ball 8 at the annular groove or flattened area forming recessed areas 12 and 13, however, allows for passage of ball 8 through this opening in housing 1, when the cover is removed, since the annular groove or flattened area in effect reduces the size of ball 8.

Having thus described the invention, what we claim as new and desire to secure by Letters Patent, is:

1. A multiway valve device comprising:
   (a) a housing having a spherical cavity formed partly in a body portion of said housing and partly in a cover portion thereof that interfaces with said body portion along a plane passing through a point displaced from the center of said spherical cavity, said body portion having at least three fluid pressure passages opening into said spherical cavity;
   (b) a ball valve operably disposed in said spherical cavity and corresponding in size thereto;
   (c) a single, ring-shaped sealing element carried on said ball in sealing engagement with the wall of said spherical cavity in said body portion, said at least three passages being arranged such that a different two of said at least three passages open into said spherical cavity adjacent the area of said ball valve enclosed by said sealing element and the other of said at least three passages opens into said spherical cavity adjacent an area of said ball valve on the side of said sealing element opposite said enclosed area when said ball valve is rotated about at least one axis of rotation thereof to one or the other of two operative positions to thereby establish fluid pressure communication between a selected two of said passages;
   (d) at least one vent passage in said body portion opening into said cavity adjacent an area of said ball valve on the side of said sealing element opposite said enclosed area; and
   (e) an annular recessed area surrounding said ball valve at the equator thereof via which fluid pressure communication is established between said other of said at least three passages and said vent passage in said one or the other of said two operative positions, the width and depth of said recessed area being such that the maximum dimension of a chord of a circle formed by the perimeter of said ball valve is less than the opening of said spherical cavity in said body portion, so as to permit passage of said ball valve through the opening at the interface of said body and cover portions when the cover portion is removed.

2. A multiway valve device as recited in claim 1 wherein the area of said ball enclosed by said sealing element is recessed relative to the surface of said ball valve to provide a flow path between said at least two fluid pressure passages.

3. A multiway valve device as recited in claim 1 wherein said ball valve is provided with a circular groove in the surface thereof in which said sealing element is housed.

4. A multiway valve device as recited in claim 1 wherein said ball valve is secured in said cavity by engagement of said cover portion of said housing with said body portion.

5. A multiway valve device as recited in claim 4 wherein said ball valve is provided with an operating lever to effect said rotation of said ball valve about said at least one axis.

6. A multiway valve device as recited in claim 5 wherein said cover further includes an opening via which said operating lever projects, said opening limiting travel of said operating lever in opposite directions to establish said two operative positions of said ball valve.

7. A multiway valve device as recited in claim 6 wherein said at least one direction of travel of said handle is in a plane transverse of said axis of rotation of said ball valve.

8. A multiway valve device as recited in claim 5 wherein said body portion is provided with a planar surface engageable with a corresponding planar surface of said cover portion along a plane passing through said cavity.

9. A multiway valve device as recited in claim 6 wherein the section of said cavity in said body portion of said housing is greater than a complementary section of said cavity in said cover portion of said housing.

10. A multiway valve device as recited in claim 1 wherein only a common one of said different two passages opens into said cavity adjacent said enclosed area when said ball valve is in a neutral position intermediate said one or the other of said operative positions thereof to interrupt said fluid pressure communication between either of said different two of said at least three passages.

11. A multiway valve device as recited in claim 10 wherein said common one of said different two passages is subject to a source of fluid under pressure.

* * * * *